(12) United States Patent
Silverman et al.

(10) Patent No.: US 7,130,427 B2
(45) Date of Patent: Oct. 31, 2006

(54) METHOD FOR PROVIDING POINT-TO-POINT ENCRYPTION IN A COMMUNICATION SYSTEM

(75) Inventors: Shmuel Silverman, Buffalo Grove, IL (US); Robert J. Corke, Glen Ellyn, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 537 days.

(21) Appl. No.: 10/621,734

(22) Filed: Jul. 17, 2003

(65) Prior Publication Data

US 2005/0015589 A1 Jan. 20, 2005

(51) Int. Cl.
*H04L 9/00* (2006.01)
(52) U.S. Cl. ........................ 380/277; 380/278; 380/283
(58) Field of Classification Search ................ 380/262, 380/277
See application file for complete search history.

(56) References Cited

U.S. PATENT DOCUMENTS

| | | | | |
|---|---|---|---|---|
| 4,933,969 A | * | 6/1990 | Marshall et al. ............ 713/177 |
| 5,345,508 A | * | 9/1994 | Lynn et al. .................... 380/46 |
| 5,412,730 A | * | 5/1995 | Jones ............................ 380/46 |
| 5,588,062 A | * | 12/1996 | Altschuler et al. ............ 380/30 |
| 6,684,331 B1 | * | 1/2004 | Srivastava ................... 713/163 |

* cited by examiner

*Primary Examiner*—Gilberto Barrón, Jr.
*Assistant Examiner*—Nima Khomassi
(74) *Attorney, Agent, or Firm*—Terri S. Hughes; Indira Saladi

(57) ABSTRACT

A transmitting device (100) transmits a first packet, comprising a second encryption vector, that is encrypted using a first encryption vector. The transmitting device transmits a second packet that is encrypted using the second encryption vector if an acknowledgement message is received within a predetermined time after transmitting the first packet; otherwise, the first packet is re-transmitted. Upon receipt of the first packet, a receiving device (102) decrypts the first packet using the first encryption vector and transmits the acknowledgement message. Upon receipt of the second packet; the receiving device attempts to decrypt a portion of the second packet using the first and second encryption vectors. If the portion of the second packet was successfully decrypted using the first encryption vector, the receiving device re-transmits the acknowledgement message for the first packet; otherwise, it transmits an acknowledgement message for the second packet.

14 Claims, 6 Drawing Sheets

METHOD FOR PROVIDING POINT-TO-POINT ENCRYPTION IN A COMMUNICATION SYSTEM

FIELD OF THE INVENTION

The present invention relates generally to providing point-to-point encryption in a communication system.

BACKGROUND OF THE INVENTION

Today, wireless local area network ("WLAN") security is located in layer two ("L2") and above. This allows the communication devices to be ASIC-based, but at the same time, L2 security allows anyone in the band to listen (eavesdrop) to the communication. While the contents/bits are garbled, anyone can listen, monitor the headers and attempt to break the payload encryption. Furthermore, the fact that the header is in the "clear" allows for traffic monitoring and analysis by an adversary, which is a significant breach in high security applications.

L2 technology is insufficient for some applications, such as Federal/homeland security, military applications, or the like. In today's world of volatile security, there is a need to create a point-to-point secure tunnel to hide the headers as well as the payload. Moreover, one must be able to update/change security on the fly to react to threats when they occur.

Thus, there exists a need for providing point-to-point encryption in a communication system.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
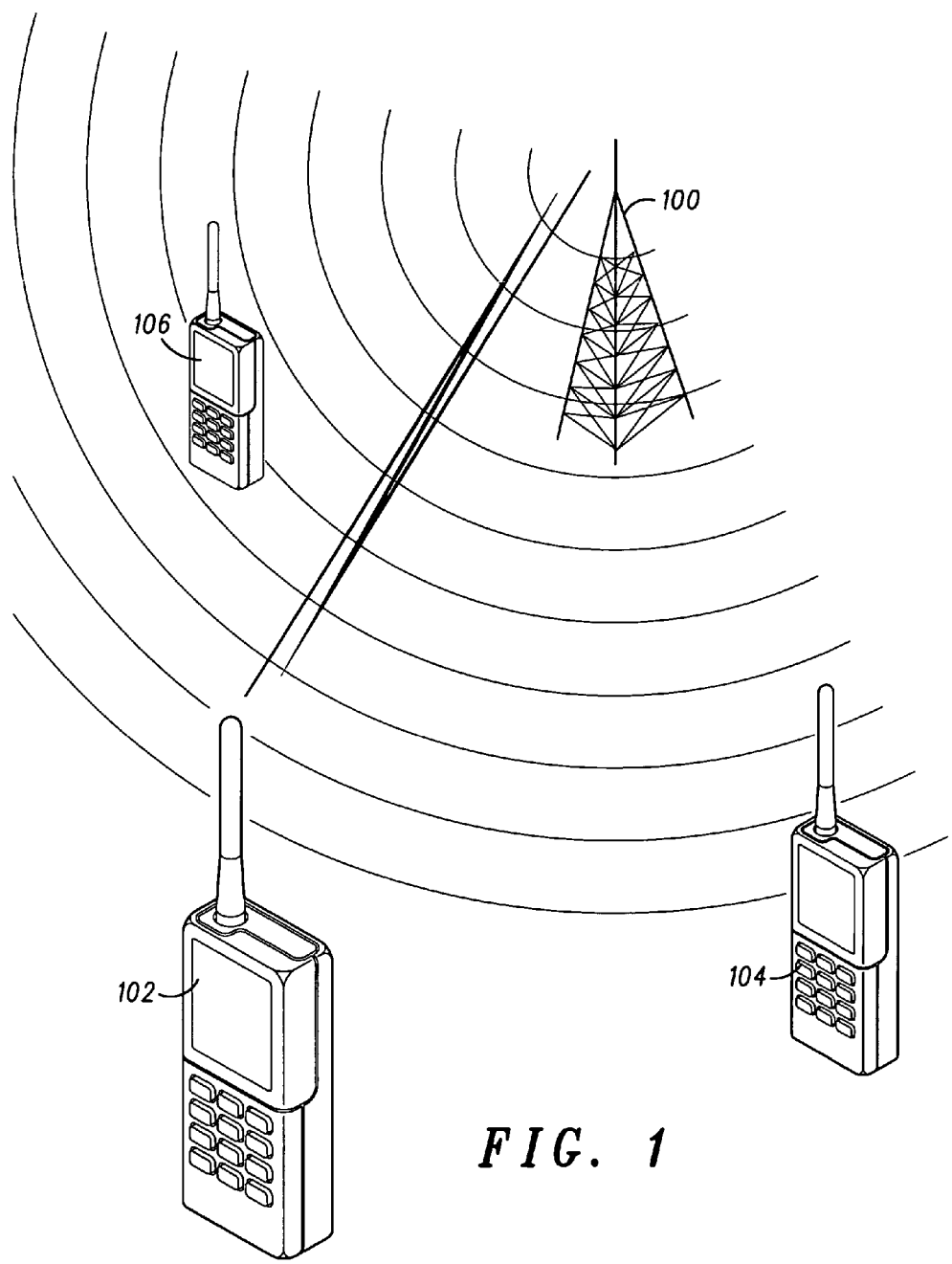
FIG. 1 illustrates a communication system comprising a transmitting device and a receiving device.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention provides point-to-point encryption in a communication system, such as a WLAN, by introducing a physical layer ("PHY") encryption that covers the entire PHY packet, including the PHY header and the training sequences; encryption on the entire PHY packet produces an infinite set of decorrelated headers that allows for point-to-point encrypted communication between a transmitting device (e.g., an access point ("AP")) 100 and a receiving device (e.g., subscriber station) 102 as illustrated in FIG. 1. For ease of explanation, the AP is described in the following discussion as being the transmitting device and the station is described in the following discussion as being the receiving device, however, the roles of each device can be reversed and still remain within the spirit and scope of the present invention. The present invention provides a method for formulating an encryption value for each transmitted symbol using m number of bits from a scrambling table to create a scalar or phasor encryption vector, and maintaining synchronization of the encryption vectors in the communication system.

Figure 2:
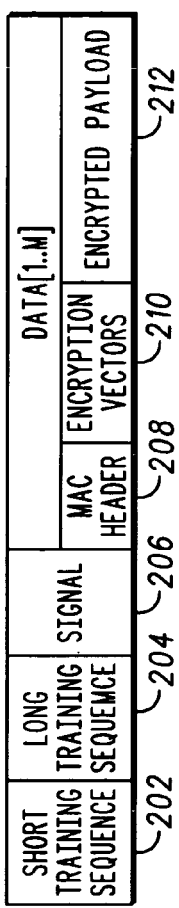
FIG. 2 illustrates a typical 802.11a PHY packet.
Figure 3:
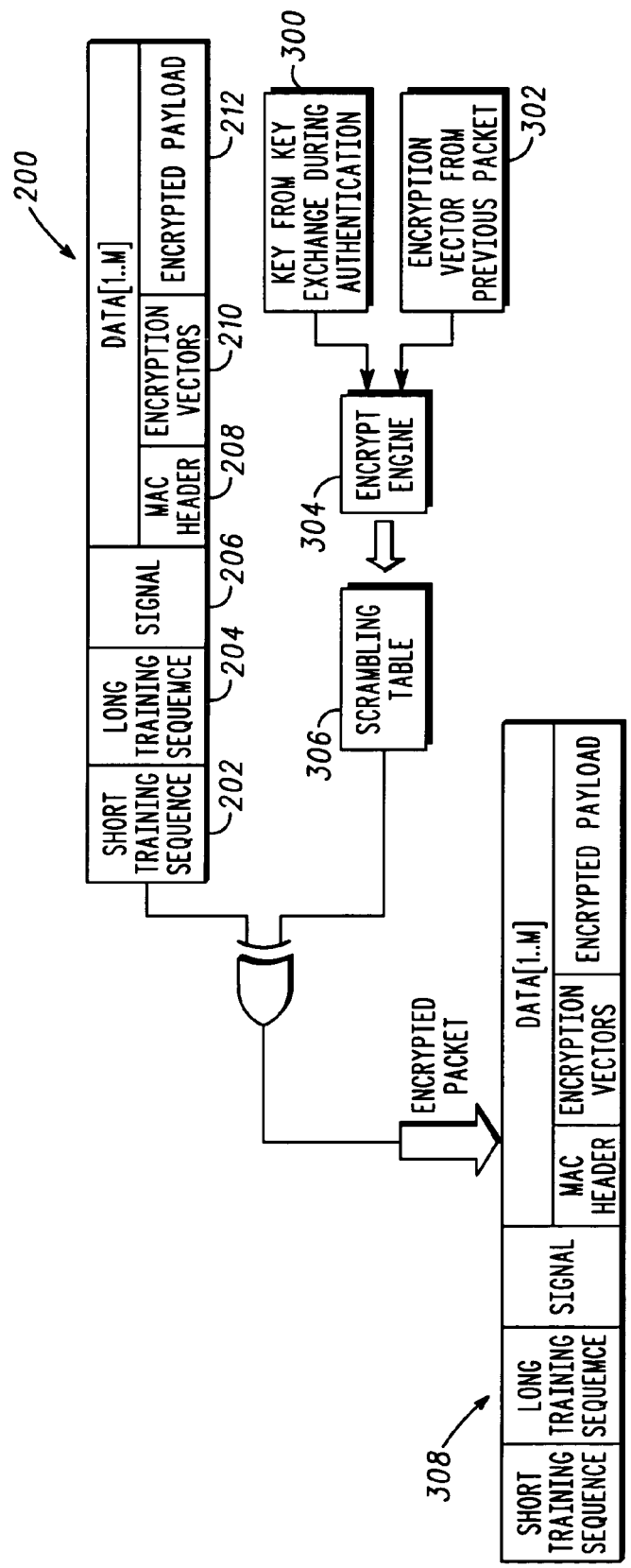
FIG. 3 illustrates a block diagram of an example encryption mechanism in the transmitting device in accordance with the present invention.

As can be seen from FIG. 2, there are a number of preambles and headers that may define a typical 802.11a PHY packet 200; it should be noted that the present invention is applicable to any PHY packet 200, not just limited to 802.11a PHY packets. As illustrated in this example, the PHY packet 200 comprises a short training sequence 202, a long training sequence 204, a PHY signal header 206, a medium access control ("MAC") header 208, at least one encryption vector 210, and encrypted payload 212. The short training sequence 202 is used to detect the start of the packet 200, and the long training sequence 204 is used for timing and frequency recovery of the packet 200. The PHY signal header 206 is used to define the modulation mode and packet length of the packet 200. The MAC header 208 is used to provide data on the packet type, source, destination, encryption seeds and frame integrity check of the packet 200. The at least one encryption vector 210 is used by an encryption engine to generate a scrambling table for a subsequent frame. In a traditional system, only the payload is encrypted, opening the door for traffic analysis and attempts to decrypt the encrypted payload 212. As noted above, the present invention introduces a PHY layer encryption that covers the entire PHY packet 200; by moving the encryption to layer one ("L1") rather than L2, the present invention creates a point-to-point secure link that is immune to data monitoring and solves the issues with the traditional WLAN security methods. Details of the present invention are illustrated for example purposes only in FIGS. 3-5, and are not intended to limit the scope of the present invention.

During association and/or authentication, keys are exchanged between the transmitting device 100 and the receiving device 102 in accordance with the current standard methods of public/private key distribution (e.g., Diffie-Hellman) to generate a set of reciprocal keys 300. As a result, the transmitting device 100 will have two keys: a public key, $AP_{public}$, and a private key, $AP_{private}$; the receiving device 102 will also have two keys: a public key, $STA_{public}$, and a private key, $STA_{private}$. The transmitting device 100 can use the $STA_{public}$ key to transmit in such a fashion that can only be decrypted by using the $STA_{private}$ key, and vice versa. For the purposes of the present invention, the association and/or authentication part of a transaction can remain in the clear according to current WLAN standards.

Once the keys have been exchanged, a point-to-point security relationship is created between the transmitting device 100 and the receiving device 102. At the same time the key exchange was performed, the transmitting device transmits encryption vector 0 302 to the receiving device, thus enabling encryption synchronization between the transmitting device 100 and the receiving device 102. For ease of explanation and clarity purposes only, the present invention will refer to the encryption vectors in sequential order.

Once the set of reciprocal keys 300 is established, the transmitting device feeds the set of reciprocal keys 300 and encryption vector 0 302 into an encryption engine 304. The encryption engine 304 applies an algorithm, such as RC4, advanced encryption standard ("AES"), or the like, to the set of reciprocal keys 300 and the encryption vector 302 to generate a scrambling table 306; the method by which the scrambling table 306 is generated is outside of the scope of the present invention. The scrambling table 306 is used to create an encryption value for every physical symbol, including training sequences, transmitted over the air between the transmitting device 100 and the receiving device 102. It should be noted that the encryption value can be a M-ary symbol containing both amplitude and phase information, where M can be any integer value.

The transmitting device uses a new encryption value (not shown) to encrypt each PHY symbol intended to be transmitted over the air. In the preferred embodiment, the encryption value and the transmitted PHY symbol are exclusive-ored with each other, however, other operations (such as complex multiply, or the like) may be used. Thus, in accordance with the present invention, the entire PHY packet 200 is encrypted and a new encrypted PHY packet 308 is transmitted over-the-air. As a result, a device 104, 106 cannot detect that the transmitting device 100 and the receiving device 102 are communicating because the training sequences 202, 204, or any other part of the PHY packet, cannot be detected without the set of reciprocal keys 300. Moreover, due to the fact that the PHY packet cannot be detected, and that all the symbols in the transmission are scrambled, there is no observable content in the packet.

When the transmitting device intends to transmit subsequent PHY packets, the process of generating the new encrypted PHY packets for transmission over the air is the same as described above with the exception of the encryption vector input into the encryption engine 304. As noted above, when transmitting the first PHY packet, the set of reciprocal keys 300 and encryption vector 0 302 is fed into the encryption engine 304 to generate the first scrambling table 306 used for encrypting the first PHY packet, wherein the first PHY packet comprises encryption vector 1. Encryption vector 0 may be a default value or a randomly selected value. When transmitting the second PHY packet, the set of reciprocal key 300 and encryption vector 1 is fed into the encryption engine 304 to generate the second scrambling table to be used for encrypting the second PHY packet, wherein the second PHY packet comprises encryption vector 2 Likewise, when transmitting the third PHY packet, the set of reciprocal keys 300 and encryption vector 2 is fed into the encryption engine 304 to generate the third scrambling table to be used for encrypting the third PHY packet, wherein the third PHY packet comprises encryption vector 3. Thus, with the exception of transmitting the first PHY packet, the set of reciprocal keys 300 and the encryption vector embedded in the previously transmitted PHY packet are used as inputs into the encryption engine 304 to generate the current scrambling table used for encrypting the current PHY packet.

Since the receiving device 102 knows the set of reciprocal keys 300 exchanged during the key exchange and received the initial encryption vector 302 used to encrypt the first PHY packet from the transmitting device 100, in this case encryption vector 0, the receiving device 102 is able to decrypt the PHY packets in their entirety and extract the embedded encryption vector for use in decrypting the following PHY packet.

At this point, the above description describes a scenario for encrypting and decrypting PHY packets where the transmitting device 100 and the receiving device 102 are fully synchronized in accordance with the present invention. In a wireless communication system, however, there is a likelihood that packets will be lost due to RF conditions. As such, the following description describes a scenario for maintaining synchronization between the transmitting device 100 and the receiving device 102 in the event of lost packets in accordance with the present invention.

Figure 4:
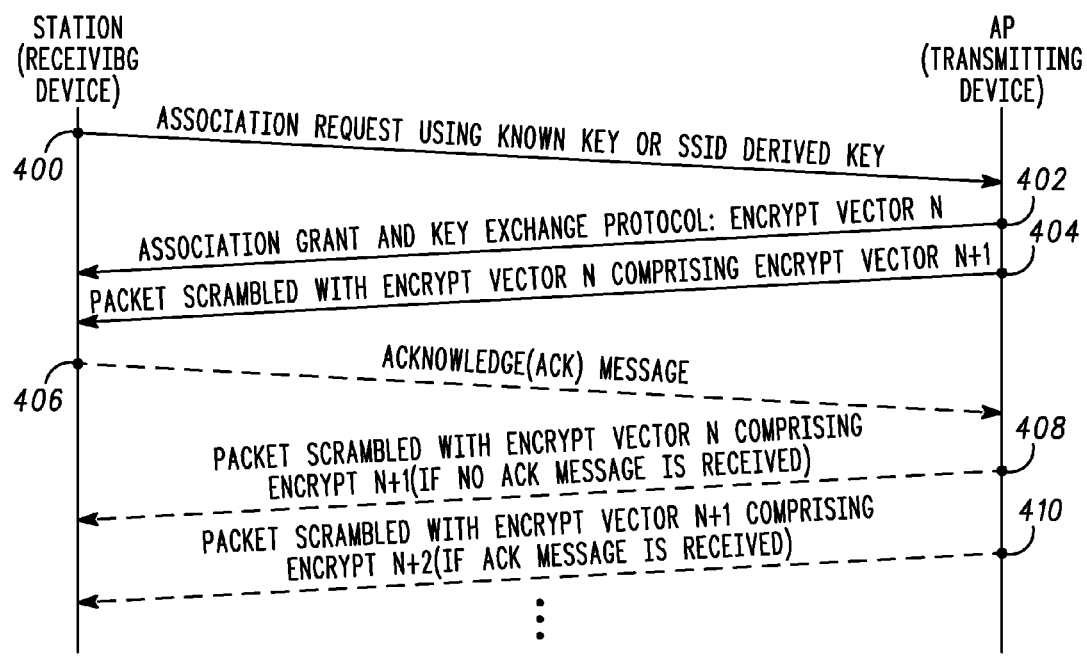
FIG. 4 illustrates a message sequence flow diagram of encryption vector synchronization in accordance with the present invention.

Referring now to FIG. 4, a message sequence flow diagram of an example of encryption vector synchronization is illustrated in accordance with the present invention. In this example, the station is requesting association with the AP (message 400), and the AP responds to the station with authentication and key exchange. Since the AP is the transmitting device in this example, the AP also transmits encryption vector N to the station (message 402) as described in detail above. When the AP has information to transmit to the station, the transmitting device 100 transmits a packet comprising encryption vector N+1 to the receiving device 102 using encryption derived from encryption vector N as described above (message 404). If, in response to transmitting the packet, the transmitting device 100 successfully receives an acknowledgement message from the receiving device (message 406), the transmitting device 100 assumes that the receiving device 102 successfully received the packet comprising encryption vector N+1, and will now use encryption vector N+1 for encrypting the next packet comprising encryption vector N+2 for transmission to the receiving device 102 (message 408). If, however, the transmitting device 100 did not successfully receive the acknowledgement message from the receiving device 102, the transmitting device 100 will retransmit the packet comprising encryption vector N+1 using the encryption derived from encryption vector N (message 410). It should be noted that the transmitting device 100 may not successfully receive the acknowledgement message from the receiving device 102 due to the acknowledgement message being lost due to RF conditions, or if the receiving device 102 never transmitted the acknowledgement message because the receiving device 102 never received the packet from the transmitting device 100.

Figure 5:
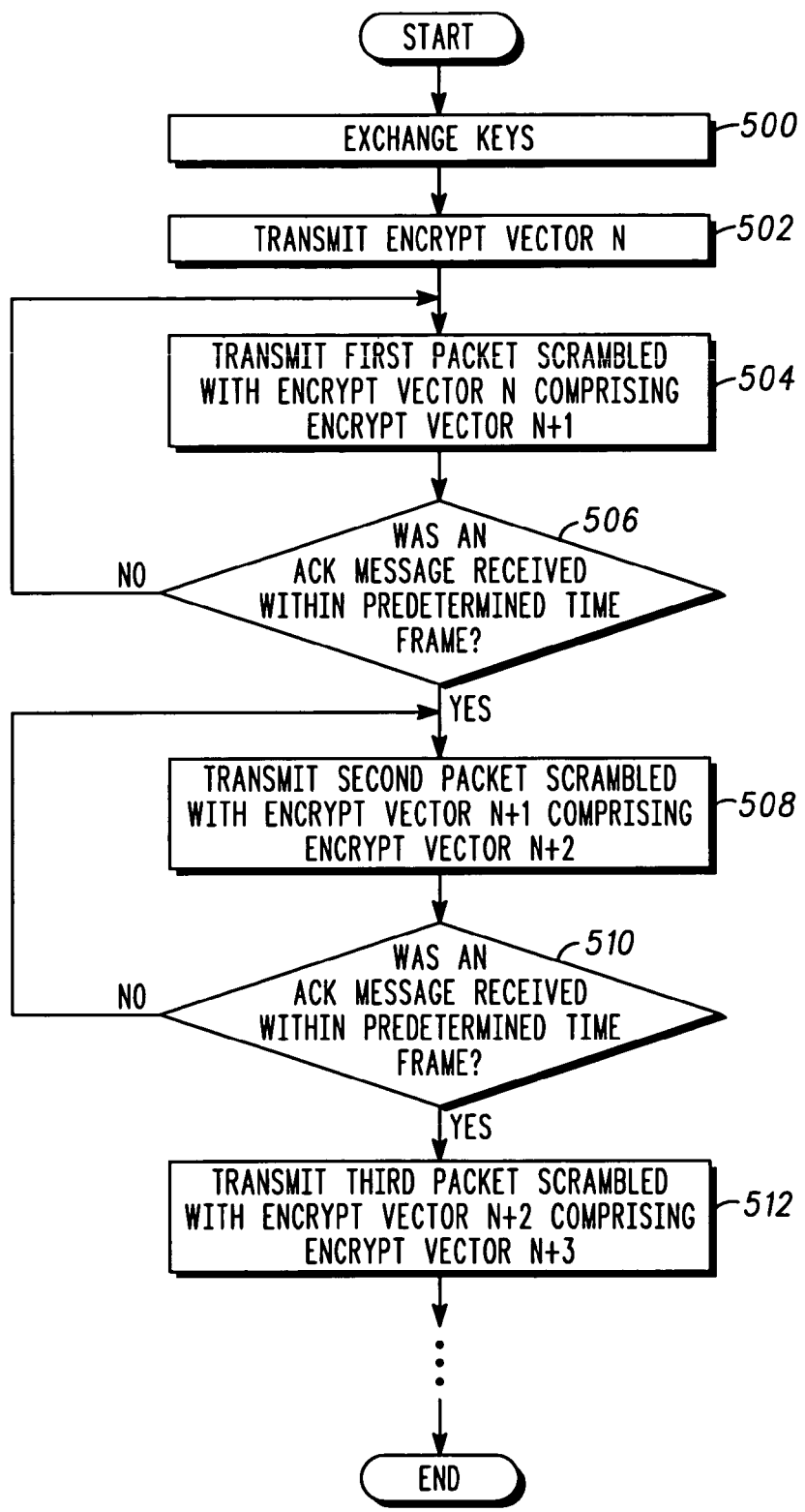
FIG. 5 illustrates a flowchart of the operational flow from the perspective of the transmitting device in accordance with the present invention.
Figure 6:
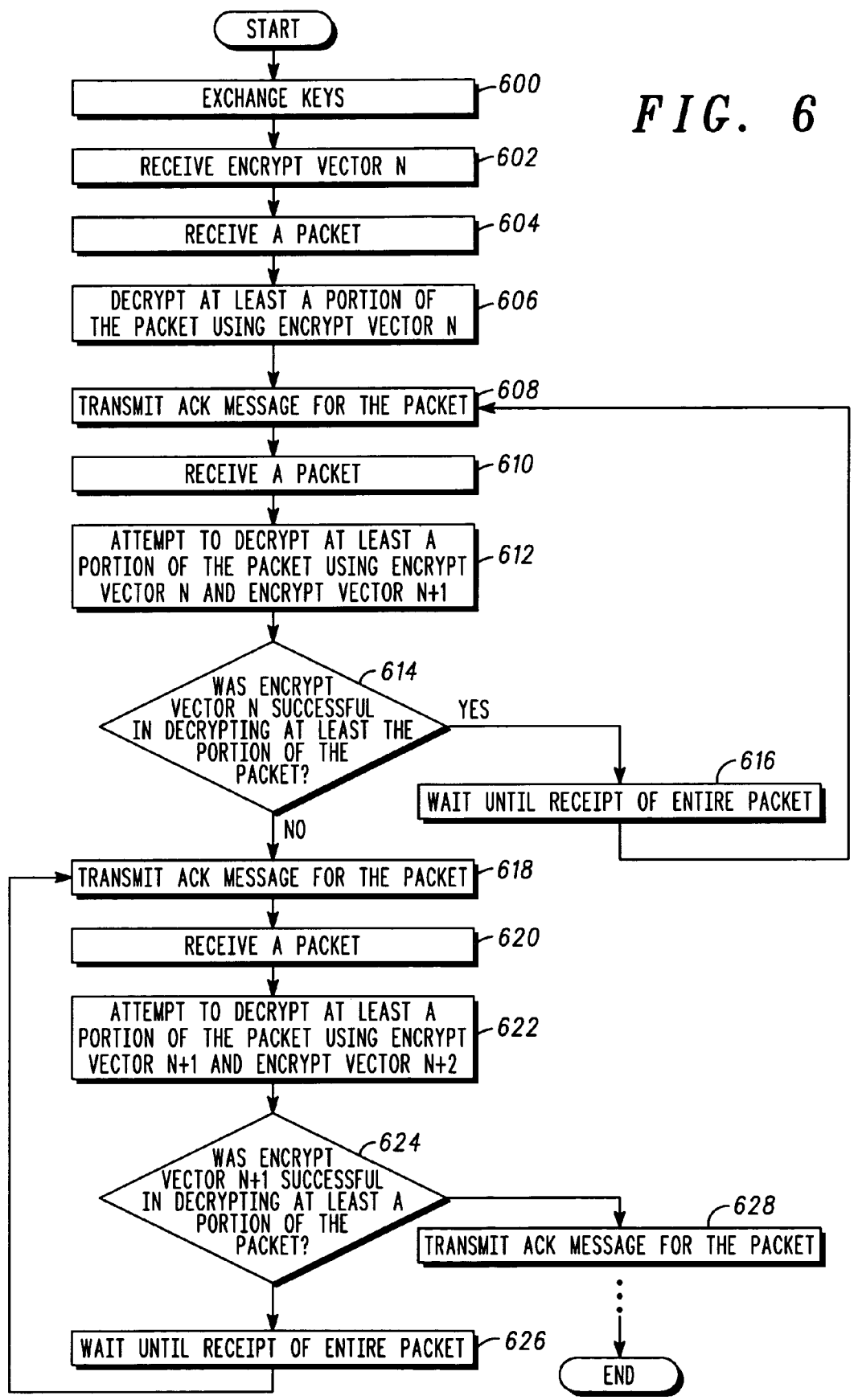
FIG. 6 illustrates a flowchart of the operational flow from the perspective of the receiving device in accordance with the present invention.
Figure 7:
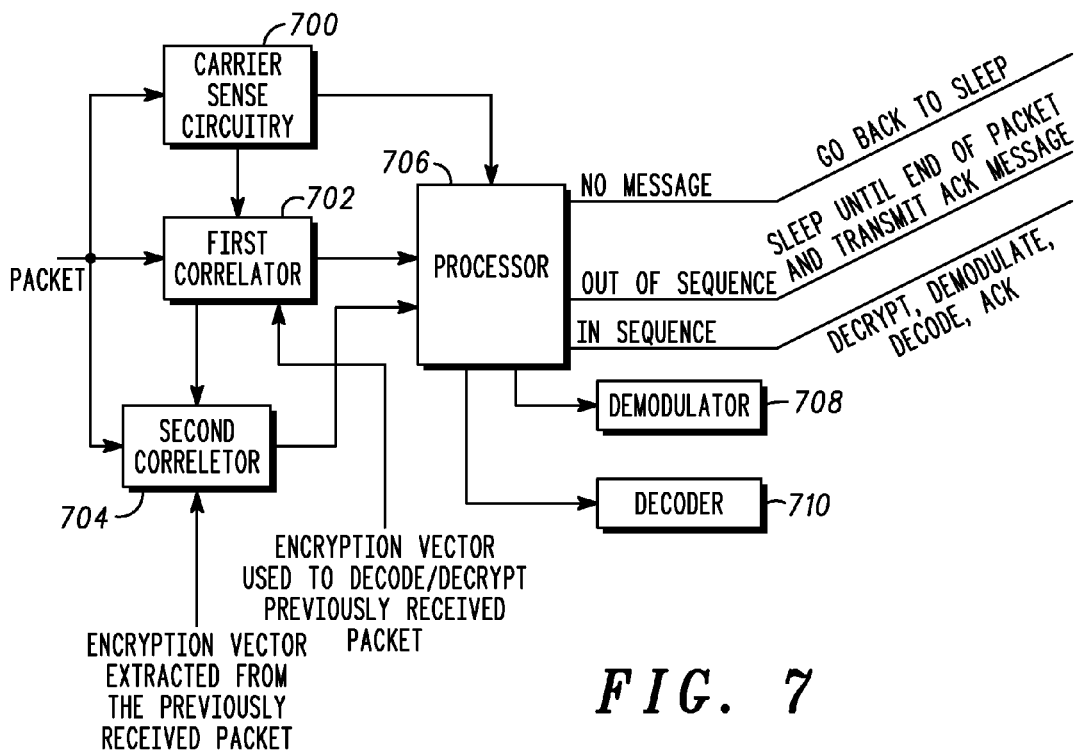
FIG. 7 illustrates a block diagram of exemplary circuitry in the receiving device in accordance with the present invention.

Let us look at the operation of the individual devices in a little more detail as described in FIGS. 5–7. From the perspective of the transmitting device 100, after the set of reciprocal keys are exchanged (step 500), the transmitting device 100 transmits encryption vector N to the receiving device 102 (step 502). When the transmitting device 100 transmits the first PHY packet 200 to the receiving device 102 (step 504), it encrypts the first PHY packet using encryption derived from encryption vector N; it is important to note that the first PHY packet comprises encryption vector N+1. After transmitting the first PHY packet to the receiving device 102, the transmitting device 100 waits a predetermined period of time to receive an acknowledgement message from the receiving device 102. If the transmitting device 100 does not receive an acknowledgement message within the predetermined time period (step 506), the transmitting device 100 retransmits the packet scrambled with encryption vector N and comprising encryption vector N+1. If the transmitting device 100, however, does receive the acknowledgment message within the predetermined time period (step 506), the transmitting device 100 transmits the next packet using an encryption algorithm derived from encryption vector N+1, wherein the next packet comprises encryption vector N+2 (step 508). The transmitting device 100 again determines whether an acknowledgement message was received within a predetermined time period (step 510). If the transmitting device 100 does not receive an acknowledgement message within the predetermined time period, the transmitting device 100 retransmits the packet using the encryption algorithm derived from encryption vector N+1 and comprising encryption vector N+2; otherwise, the transmitting device 100 proceeds with transmitting the next packet (step 512). Thus, when the transmitting device 100 transmits packets to the receiving device 102, it first encrypts the packet (i.e., each PHY symbol) using an encryption algorithm derived from an encryption vector extracted from the previous packet transmitted (in the case of transmitting the first packet, the transmitting device 100 transmits the encryption vector to the receiving device 102). The transmitting device 100 does not proceed to transmit the next packet using an encryption algorithm derived from the next encryption vector unless it receives an acknowledgement message from the receiving device 102; the acknowledgement message verifies to the transmitting device 100 that the receiving device 102 received the previous packet, and thus has received the encryption vector that will be needed to decrypt the next packet. From the perspective of the receiving device 102, after the set of reciprocal keys are exchanged (step 600), the receiving device 102 receives encryption vector N from the transmitting device 100 (step 602). Upon receipt of a packet (step 604), the receiving device 102 decrypts at least a portion of the packet using encryption vector N (step 608). If the receiving device 102 is successful in decrypting at least the portion of the packet using encryption vector N, the receiving device 102 transmits an acknowledgement message for the packet to the transmitting device 100 (step 608). Upon receipt of the next packet (step 610), the receiving device 102 attempts to decrypt at least a portion of the next packet using both encryption vector N+1 (the expected encryption vector) and encryption vector N (the previous encryption vector) in accordance with the present invention (step 612). In a WLAN system, the receiving device 102 is capable of decrypting at least a portion of the next packet (e.g., the training sequences) using encryption vectors N+1 and N concurrently, thus allowing a decision as to which encryption vector was used by the transmitting device 100 to be made early on.

If the receiving device 102 determines that the next packet (from step 610) was encrypted using encryption vector N (at step 614), the receiving device 102 assumes that the transmitting device 100 did not successfully receive the previous acknowledgement message (from step 608), and the receiving device 102 identifies the next packet (from step 610) as a retransmission of the previous packet (from step 604), after which the receiving device 102 waits/sleeps until receipt of the entire packet (at step 616) and retransmits the previous acknowledgement message to the transmitting device 100 (from step 608) in order to maintain synchronization; in other words, since the receiving device 102 identified the previously received packet (from step 610) as a retransmission of the previously received packet (from step 604), upon receipt of the next packet, the receiving device will attempt to decrypt the packet using encryption vectors N and N+1 as opposed to encryption vectors N+1 and N+2.

If the receiving device 102, however, determines that the next packet (from step 610) was encrypted using encryption vector N+1 (at step 614), the receiving device 102 assumes that the transmitting device 100 successfully received the acknowledgement message (at step 608) and encrypted the next packet (from step 610) in sequence as a result. As such, the receiving device 102 transmits an acknowledgement message for the packet (from step 612) to the transmitting device 100 (at step 618). Upon receipt of yet the next packet (at step 620), the receiving device 102 attempts to decrypt the packet (from step 620) using encryption vectors N+1 (the previously used encryption vector) and the encryption vector N+2 (the expected encryption vector that was identified from the previously received packet) concurrently (at step 622). The receiving device 102 continues the process as described above to determine which encryption vector was actually used by the transmitting device 100 (in steps 624, 626, 628) until the communication ceases.

Figure 8:
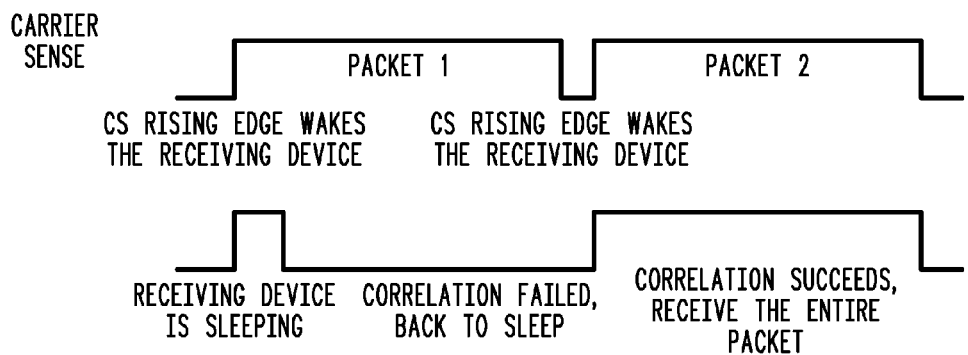
FIG. 8 illustrates a timing diagram depicting power savings at the receiver in accordance with the preferred embodiment of the present invention.

In other words, as illustrated in FIG. 7, the receiving device 102 comprises at least carrier sense circuitry 700, a first correlator 702, a second correlator 704, a processor 706, a demodulator 708 and a decoder 710 in accordance with the present invention. The first and second correlators 702, 704 are coupled to the carrier sense circuitry 700. The processor 706 is coupled to the carrier sense circuit 700, the first correlator 702 and the second correlator 704. The demodulator 708 and the decoder 710 are coupled to the processor 706. The carrier sense circuitry 700 is always monitoring the RF energy on the link. When the carrier sense circuitry 700 detects a carrier indicating the transmission of a packet on the link (i.e., a sudden rise in energy) as illustrated in FIG. 8, the first and second correlators 702, 704 attempt to decrypt and correlate a portion of the packet (e.g., the training sequences) using encryption vectors N and N+1, respectively. Once the correlators 702, 704 have attempted to decrypt and correlate at least a portion of the packet, the processor 706 classifies the packet as one of the following: irrelevant, out-of-sequence, and in-sequence.

If the packet is classified as irrelevant, the receiving device 102 does not continue processing the packet, the correlators 702, 704 are turned off, and the carrier sense circuitry 700 returns to search for the beginning of a new packet. A packet is typically classified as irrelevant when intended for another receiving device.

If the packet is classified as out-of-sequence, the receiving device 102 waits for the carrier sense circuitry 700 to indicate the end of the packet whereby the receiving device 102 retransmits the previous acknowledgement message to the transmitting device 100. When the packet is classified as out-of-sequence, the receiving device 102 does not turn on the decryption, demodulation and decoding circuits 708, 710 because the packet was previously received, decrypted, demodulated and decoded. A packet is typically classified as out-of-sequence when the previous acknowledgement message transmitted by the receiving device 102 to the transmitting device 100 was lost (i.e., never received by the transmitting device), and thus, the transmitting device 100 retransmits the previously received packet.

If the packet is classified as in-sequence, the receiving device 102 turns on the decryption, demodulation and decoding circuits 706, 708, and transmits an acknowledgement message for the packet accordingly. A packet is typically classified as in-sequence when the receiving device 102 successfully received the previous packet, and the transmitting device 100 successfully received the acknowledgement message for the previous packet.

It is important to note that the present invention requires the carrier sense circuitry 700 to remain in an active state at all times. However, the present invention allows the first correlator 702, the second correlator 704, and the processor 706 to be in a sleep state until the carrier sense circuitry 700 detects the carrier indicating the transmission of the packet. Further, the present invention allows the demodulator 708 and the decoder 710 to be in a sleep state until at least one of the first and second correlators 702, 704 successfully decrypts a portion of the packet and the processor 706 determines that the packet was not previously transmitted (i.e., not a packet that has been previously decrypted, demodulated, decoded, and acknowledged by the receiving device 102).

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
   transmitting a first physical layer packet encrypted using a first encryption vector to a receiving device, wherein the first physical layer packet comprises a second encryption vector; and
   transmitting a second physical layer packet encrypted using the second encryption vector to the receiving device if an acknowledgement message is received within a predetermined period of time after transmitting the first physical layer packet; otherwise, re-transmitting the first physical layer packet encrypted using the first encryption vector to the receiving device.

2. The method of claim 1 wherein the second physical layer packet comprises a third encryption vector.

3. The method of claim 1 and further comprising the steps of:
   performing a key exchange with the receiving device to generate a reciprocal set of keys; and
   transmitting the first encryption vector to the receiving device.

4. The method of claim 1 wherein the first physical layer packet and the second physical layer packet comprises physical symbols.

5. The method of claim 4 and further comprising the steps of:
   inputting the first encryption vector and a key from the reciprocal set of keys into an encryption engine to generate a first scrambling table for the first packet;
   generating an encryption value from the first scrambling table for each physical symbol in the first physical layer packet; and
   combining each physical symbol in the first physical layer packet with an encryption value via an operation in order to encrypt the first physical layer packet.

6. The method of claim 5 wherein the operation is one of an exclusive-or operation, a complex multiply operation, a multiply operation, a divide operation, an addition operation, and a subtract operation.

7. The method of claim 5 and further comprising the steps of:
   inputting the second encryption vector and the key from the reciprocal set of keys into the encryption engine to generate a second scrambling table for the second physical layer packet;
   generating an encryption value from the second scrambling table for each physical symbol in the second physical layer packet; and
   combining each physical symbol in the second physical layer packet with an encryption value via an operation in order to encrypt the second physical layer packet.

8. A method comprising the steps of:
   receiving a first physical layer packet from a transmitting device;
   decrypting the first physical layer packet using a first encryption vector, wherein the first packet comprises a second encryption vector;
   transmitting an acknowledgement message for the first physical layer packet to the transmitting device;
   receiving a second physical layer packet from the transmitting device;
   attempting to decrypt at least a portion of the second physical layer packet using the first encryption vector and the second encryption vector; and
   if the at least portion of the second physical layer packet was successfully decrypted using the first encryption vector, re-transmitting the acknowledgement message for the first physical layer packet; otherwise, transmitting an acknowledgement message for the second physical layer packet.

9. The method of claim 8 and further comprising the steps of:
   after the step of re-transmitting the acknowledgement message for the first packet, receiving a third packet from the transmitting device; and
   attempting to decrypt at least a portion of the third packet using the first encryption vector and the second encryption vector.

10. The method of claim 8 wherein the second physical layer packet comprises a third encryption vector.

11. The method of claim 10 and further comprising the steps of:
    after the step of transmitting the acknowledgement message for the second packet, receiving a third packet from the transmitting device; and
    attempting to decrypt at least a portion of the third physical layer packet using the second encryption vector and the third encryption vector.

12. The method of claim 8 and further comprising the steps of:
    performing a key exchange with the transmitting device; and
    receiving the first encryption vector from the transmitting device.

13. The method of claim 8 wherein the first encryption vector is randomly selected value.

14. The method of claim 8 wherein the step of attempting to decrypt at least a portion of the second physical layer packet using the first encryption vector and the second encryption vector is performed concurrently.

* * * * *

UNITED STATES PATENT AND TRADEMARK OFFICE
CERTIFICATE OF CORRECTION

PATENT NO. : 7,130,427 B2  
APPLICATION NO. : 10/621734  
DATED : October 31, 2006  
INVENTOR(S) : Silverman et al.

Page 1 of 1

It is certified that error appears in the above-identified patent and that said Letters Patent is hereby corrected as shown below:

Column 7, line 55, please add --physical layer-- after "first"

Column 8, line 36, please add --physical layer-- after "first"

Column 8, line 36, please add --physical layer-- after "third"

Column 8, line 38, please add --physical layer-- after "third"

Column 8, line 47, please add --physical layer-- after "second"

Column 8, line 47, please add --physical layer-- after "third"

Column 8, line 59, please add --a-- after "is"

Signed and Sealed this

Fifth Day of June, 2007

JON W. DUDAS  
*Director of the United States Patent and Trademark Office*